US011860977B1

(12) United States Patent
Xing et al.

(10) Patent No.: US 11,860,977 B1
(45) Date of Patent: Jan. 2, 2024

(54) HIERARCHICAL GRAPH NEURAL NETWORKS FOR VISUAL CLUSTERING

(71) Applicant: Amazon Technologies, Inc., Seattle, WA (US)

(72) Inventors: Yifan Xing, Bellevue, WA (US); Tianjun Xiao, Nanjing (CN); Tong He, Shanghai (CN); Yongxin Wang, Seattle, WA (US); Yuanjun Xiong, Seattle, WA (US); Wei Xia, Seattle, WA (US); David Paul Wipf, Jing'An (CN); Zheng Zhang, Shanghai (CN); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 416 days.

(21) Appl. No.: 17/307,701

(22) Filed: May 4, 2021

(51) Int. Cl.
*G06F 18/2323* (2023.01)
*G06N 20/00* (2019.01)
(Continued)

(52) U.S. Cl.
CPC .... *G06F 18/2323* (2023.01); *G06F 18/23213* (2023.01); *G06F 18/2415* (2023.01); *G06F 18/24147* (2023.01); *G06N 20/00* (2019.01)

(58) Field of Classification Search
CPC .......... G06F 18/2323; G06F 18/23213; G06F 18/24147; G06F 18/2415; G06F 16/9024; G06F 16/27; G06F 16/289; G06F 16/355; G06F 16/783; G06N 20/00; G06N 3/08; G06N 3/045; G06N 5/022; G06N 20/10;
(Continued)

(56) References Cited

U.S. PATENT DOCUMENTS

| 11,715,132 B2* | 8/2023 | Flinn | G06Q 30/0255 |
| | | | 705/14.66 |
| 2007/0005341 A1* | 1/2007 | Burges | G06F 16/355 |
| | | | 704/9 |

(Continued)

OTHER PUBLICATIONS

Sarfraz et al., "Efficient Parameter-Free Clustering Using First Neighbor Relations", Proceedings of the IEEE/CVF Conference on Computer Vision and Pattern Recognition, 2019, 11 pages.
(Continued)

*Primary Examiner* — Michael S Osinski
(74) *Attorney, Agent, or Firm* — NICHOLSON DE VOS WEBSTER & ELLIOTT LLP

(57) ABSTRACT

Techniques for performing visual clustering with a hierarchical graph neural network framework including a joint linkage prediction and density estimation graph model are described. Embodiments herein recurrently run the joint linkage prediction and density estimation graph model to generate intermediate clusters in multiple iterations (e.g., until convergence) to obtain a final clustering result. In certain embodiments, for each iteration, the input graph contains nodes that are merged from nodes assigned to intermediate clusters from the previous iteration. By using a small and fixed bandwidth k in each iteration, embodiments herein alleviate the sensitivity to the k selection for different clustering applications. Certain embodiments herein remove the tuning of a different k (e.g., k-bandwidth) for k-nearest neighbor graph construction over different clustering applications.

20 Claims, 8 Drawing Sheets

(51) Int. Cl.
*G06F 18/2415* (2023.01)
*G06F 18/23213* (2023.01)
*G06F 18/2413* (2023.01)

(58) Field of Classification Search
CPC .......... G06N 3/02; G06N 3/047; G06N 3/082; G06N 3/084; G06N 3/088; G06V 10/426; G06V 10/82
See application file for complete search history.

(56) References Cited

U.S. PATENT DOCUMENTS

| | | | | |
|---|---|---|---|---|
| 2009/0052784 | A1* | 2/2009 | Covell | G06F 16/783 382/209 |
| 2014/0280224 | A1* | 9/2014 | Feinberg | G06F 16/9024 707/748 |
| 2015/0213370 | A1* | 7/2015 | Chakrabarti | G06Q 50/01 706/52 |
| 2017/0034592 | A1* | 2/2017 | Ray | G06Q 30/0275 |
| 2018/0197069 | A1* | 7/2018 | Reimann | G06N 7/01 |
| 2018/0357555 | A1* | 12/2018 | Goldschmidt | G06N 20/00 |
| 2019/0034761 | A1* | 1/2019 | Huang | G06V 10/82 |
| 2019/0042879 | A1* | 2/2019 | Munoz | G06F 16/9024 |
| 2019/0130264 | A1* | 5/2019 | Rossi | G06N 3/08 |
| 2019/0278808 | A1* | 9/2019 | Xia | G06F 9/50 |
| 2019/0286657 | A1* | 9/2019 | Li | G06F 18/29 |
| 2019/0295721 | A1* | 9/2019 | Madabhushi | G06N 3/08 |
| 2019/0319868 | A1* | 10/2019 | Svennebring | H04L 41/147 |
| 2019/0354993 | A1* | 11/2019 | Ben-Or | G06N 20/00 |
| 2020/0160121 | A1* | 5/2020 | Parasrampuria | G06N 5/022 |
| 2020/0285944 | A1* | 9/2020 | Lee | G06F 16/9024 |
| 2020/0387783 | A1* | 12/2020 | Bagherinezhad | G06F 16/90335 |
| 2021/0067558 | A1* | 3/2021 | Ni | H04L 41/14 |
| 2021/0097339 | A1* | 4/2021 | Agrawal | G06F 17/18 |
| 2021/0158227 | A1* | 5/2021 | Budzik | G06N 5/01 |
| 2021/0173896 | A1* | 6/2021 | Perumalla | G06F 16/2343 |
| 2021/0174257 | A1* | 6/2021 | Pothula | G06F 16/27 |
| 2021/0201270 | A1* | 7/2021 | Cross | G06F 18/213 |
| 2021/0209446 | A1* | 7/2021 | Shi | G06N 3/105 |
| 2021/0216813 | A1* | 7/2021 | Pouyan | G06N 5/01 |
| 2021/0224269 | A1* | 7/2021 | Dai | G06F 21/62 |
| 2021/0224619 | A1* | 7/2021 | Kaltwang | G06V 10/84 |
| 2021/0256355 | A1* | 8/2021 | Chen | G06N 3/08 |
| 2021/0279508 | A1* | 9/2021 | Guo | G06F 18/23 |
| 2021/0281593 | A1* | 9/2021 | Liu | G06F 16/9535 |
| 2021/0374488 | A1* | 12/2021 | Rajani | G06F 18/214 |
| 2022/0005332 | A1* | 1/2022 | Metzler | G08B 13/1968 |
| 2022/0059186 | A1* | 2/2022 | Li | G16B 15/30 |
| 2022/0101187 | A1* | 3/2022 | Malur Srinivasan | G06N 20/00 |
| 2022/0129733 | A1* | 4/2022 | Yee | G06N 5/022 |
| 2022/0230053 | A1* | 7/2022 | Betthauser | G06N 3/045 |
| 2022/0318641 | A1* | 10/2022 | Carreira-Perpiñán | G06N 20/20 |
| 2022/0351076 | A1* | 11/2022 | Kim | G06Q 50/01 |
| 2023/0033019 | A1* | 2/2023 | Li | G06F 16/9024 |
| 2023/0133683 | A1* | 5/2023 | Xie | G06Q 30/0241 706/21 |
| 2023/0169358 | A1* | 6/2023 | Zayats | G06N 7/01 706/55 |
| 2023/0185253 | A1* | 6/2023 | Kocheturov | G06N 3/006 706/23 |

OTHER PUBLICATIONS

Yang et al., "Learning to Cluster Faces on an Affinity Graph", In Proceedings of the IEEE Conference on Computer Vision and Pattern Recognition, 2019, pp. 2298-2306.

Yang et al., "Learning to Cluster Faces via Confidence and Connectivity Estimation", In Proceedings of the IEEE/CVF Conference on Computer Vision and Pattern Recognition, 2020, pp. 13369-13378.

* cited by examiner

200

Algorithm : Hierarchical Graph Construction

Input $N, \{f_i\}, \{y_i\}, k, L$;
$G'_0 \leftarrow \{V_0, \varnothing\}$;
for $i \leftarrow 1$ *to* $N$ do
$\quad h_i^{(0)} \leftarrow \bar{h}_i^{(0)} \leftarrow f_i$;
end
for $l \leftarrow 1$ *to* $L$ do
$\quad \{v_i^{(l)}\} \leftarrow \{C_i^{(l)}\} \leftarrow \text{Connected}(G'_{l-1})$;
$\quad \{h_i^{(l)}\}, \{\bar{h}_i^{(l)}\} \leftarrow \text{From (Eq 9)}$;
$\quad G_l \leftarrow k\text{-NN}(\{h_i^{(l)}\}, k)$;
$\quad \{e_{ij}^{(l)}\}, \{d_i^{(l)}\} \leftarrow \text{Encode}(G_l, \{[h_i^{(l)}, \bar{h}_i^{(l)}]\})$;
$\quad G'_l, E'_l \leftarrow \text{Decode}(\{e_{ij}^{(l)}\}, \{d_i^{(l)}\})$;
end
Return $\{G_l\}, \{G'_l\}$;

FIG. 2

HIERARCHICAL GRAPH NEURAL NETWORKS FOR VISUAL CLUSTERING

BACKGROUND

Object recognition is a process by which an object within a digital image (such as a photograph or video frame) is identified or verified by a computer. Object recognition is usually performed by a software application running on a computer that analyzes an image to recognize one or more objects within the image.

BRIEF DESCRIPTION OF DRAWINGS

Various embodiments in accordance with the present disclosure will be described with reference to the following drawings.

FIG. 2 is a block diagram illustrating an example iteration flow of an algorithm for hierarchical graph construction according to some embodiments.

DETAILED DESCRIPTION

Figure 1:
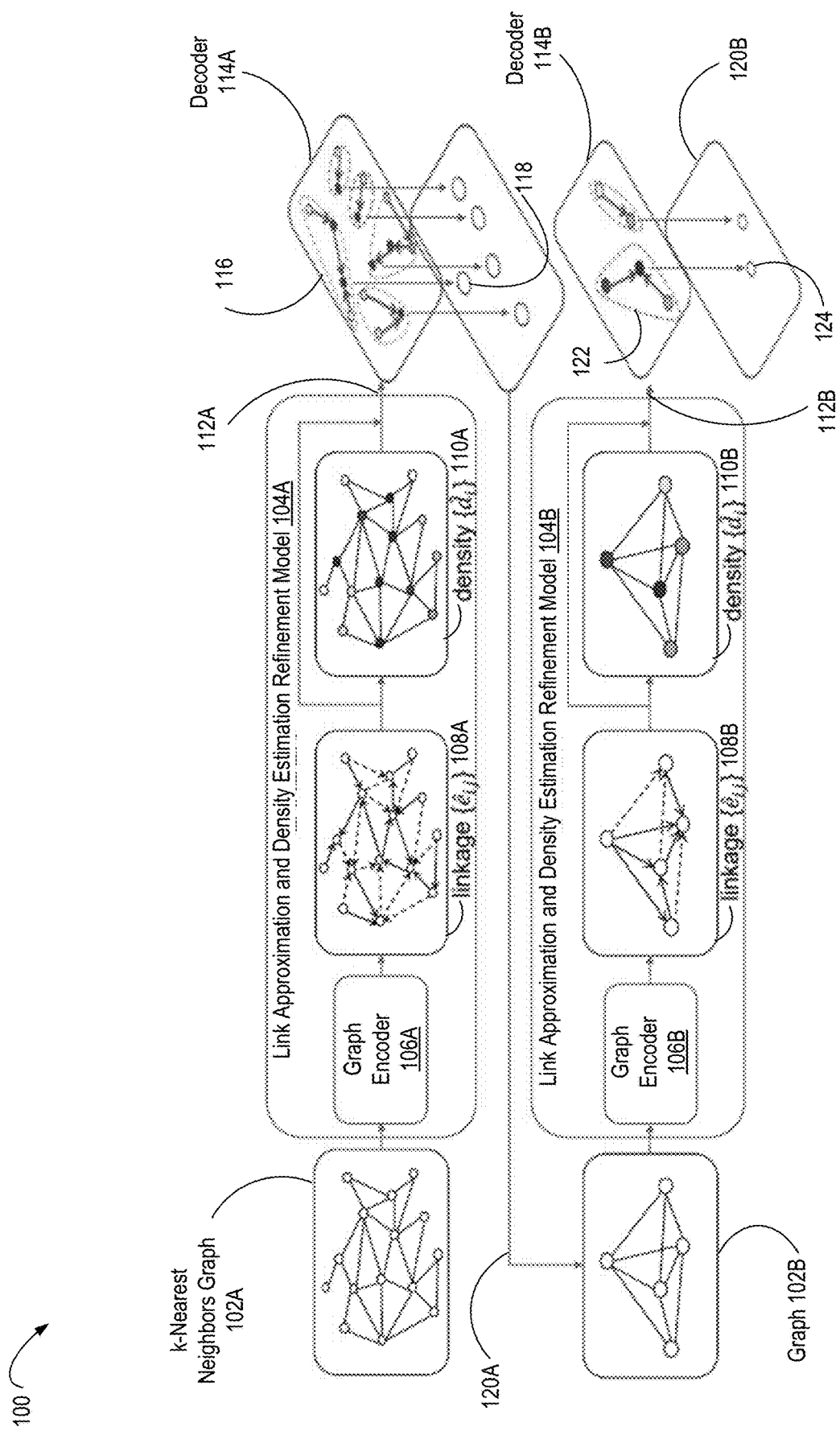
FIG. 1 is a block diagram illustrating a hierarchical clustering framework of a machine learning model including a link approximation and density estimation refinement model for visual clustering according to some embodiments.

The present disclosure relates to methods, apparatus, systems, and non-transitory computer-readable storage media for hierarchical graph neural networks for visual clustering. In certain embodiments, a graph is a data structure consisting of two components, nodes (e.g., vertices) and edges (e.g., links or lines) connecting certain vertices. For example, where a graph neural network (GNN) is a type of machine learning model that directly operates on the graph structure. An example usage of an GNN is node classification, e.g., where a node in the graph is associated with a label, and the model is to predict the label(s) of the nodes.

Visual clustering is an essential technology for many real-world applications, for instance, automatic photo grouping, image tagging, and data annotation for machine learning systems. Embodiments herein provide a hierarchical graph neural network framework as well as a joint linkage prediction and density estimation graph model for visual clustering. In certain embodiments, visual clustering is the task of grouping visually similar images together from an unorganized set. A GNN may operate on a complex graph structure to extract useful semantic information. For example, with the GNN based visual clustering method relying on the construction of a k-nearest neighbor graph built from the feature (e.g., visual embedding) set of the input images. However, in certain embodiments, single GNN based visual clustering is very sensitive to the selection of the k-bandwidth parameter during the construction process of the k-nearest neighbor graph. For instance, one might need a very different k to make the model work on face image clustering in comparison to clothing image clustering. To this end, embodiments herein avoid (e.g., any) problems caused by the sensitivity of the k-bandwidth parameter by bypassing the need to tune it for different applications.

Certain embodiments herein are directed to a joint linkage prediction and density estimation graph neural network architecture which is fast and accurate. Certain embodiments herein recurrently run the joint graph neural network model to generate intermediate clusters in multiple iterations (e.g., until convergence) to obtain a final clustering result. In certain embodiments, for each iteration, the input graph contains nodes that are merged from nodes assigned to intermediate clusters from the previous iteration. By using a small and fixed bandwidth k in each iteration, embodiments herein alleviate the sensitivity to the k selection for different clustering applications. Certain embodiments herein remove the tuning of a different k (e.g., k-bandwidth) for k-nearest neighbor graph construction over different clustering applications. Embodiments herein improve the clustering performance and the runtime for a clustering task.

As noted above, graph neural network based visual clustering methods rely on constructing a k-nearest neighbors (k-NN) graph of an input feature (e.g., visual embedding) set, e.g., where k is an integer. However, test-time accuracy can be sensitive to choices of the value of k (e.g., bandwidth parameter) as cluster sizes vary across datasets. Embodiments herein provide a hierarchical graph visual clustering framework (e.g., link approximation and density estimation refinement (LANDER) model and/or hierarchical clustering LANDER (Hi-LANDER) model) to bypass a dataset-specific tuning of k. Embodiments herein introduce a new joint graph link prediction and density estimation model with a unified learning approach for training. Embodiments herein provide a combined hierarchical framework that outperforms the current state-of-the-art methods on visual clustering tasks and benchmarks, attaining superior accuracy and runtime speed without dataset-specific parameter (e.g., "k") tuning. Embodiments herein allow the use of the same value of k for different applications, e.g., not tuning k for each different application.

Supervised visual clustering aims to train a clustering model based on visual embeddings from label-annotated datasets. Visual clustering may include first constructing a k-NN graph using the features (e.g., embedding vectors), using a GNN to encode the information from this graph, and decoding predicted graph node attributes or edges into cluster assignments. In certain embodiments, there is a fundamental hyper-parameter in applying a GNN clustering model to real-world scenarios: the bandwidth k for the constructed k-NN graph. With a fixed selection of k, the GNN model runs on a regular graph while the test-time cluster size can be irregular, varying drastically across clusters and applications. This limitation leads to the sensitivity of GNN clustering accuracy to the selection of k. The "optimal" k is usually related to the label distribution of the dataset. This could be a major obstacle in applying these clustering methods in practice, where the optimal k in test samples may be unknown. Embodiments herein provide a model that is not reliant on the specific selection of this bandwidth parameter. Certain embodiments herein are directed to a new framework for GNN based visual clustering that is robust to the choice of k.

Certain embodiments herein consider the clustering process on the input k-NN graph a graph coarsening process, which means it can be done in multiple steps. Certain embodiments herein recurrently run the same GNN model and generate intermediate clusters in multiple iterations (e.g., until convergence) to obtain the final cluster result. In certain embodiments, for each iteration, the input graph contains the nodes that are merged from nodes assigned to intermediate clusters from the previous iteration. Using a small and fixed bandwidth k (e.g., k of less than 2, 3, 4, 5, 6, 7, 8, 9, 10, 11, etc.) in each iteration, embodiments herein alleviate the need to tune (e.g., modify) k and reduces the computation cost. Certain embodiments utilize a GNN model as the base model for the hierarchy to jointly predict the pairwise linkage and cluster density, e.g., where the pairwise linkage and cluster density information is then used to decode final clustering results. Certain embodiments herein propose a novel objective to unify the learning of the two predictions, where the unified design leads to the increase in prediction quality and significantly reduces the computation and also benefits from the hierarchical nature of the framework. Embodiments herein may be utilized with varying applications, for example, face clustering, fashion clustering, and natural species clustering. Embodiments herein bypass the necessity to tune the optimal k-bandwidth parameter over the varying applications.

Embodiments herein (i) provide a novel framework for graph neural network based visual clustering using a hierarchical learning approach, which removes the reliance on tuning the bandwidth parameter in test-time k-NN graph construction process, (ii) provide a new GNN model (e.g., LANDER) for joint linkage prediction and density estimation together to achieve high accuracy and runtime efficiency, and (3) outperform other methods of visual clustering.

Embodiments herein form a homogenous model hierarchy by multiple k-NN graphs recurrently built with clustering and feature aggregation, e.g., in contrast to a heterogeneous model hierarchy (e.g., of two graphs constructed to attend to different factors). Embodiments herein provide a supervised visual clustering. Embodiments herein are directed to a model design that jointly learns a density measurement on the graph nodes and the linkage at the same time, e.g., with two supervision signals of (i) a linkage classification objective and (ii) a unified density estimation objective. Embodiments herein utilize the expressive power of a GNN for joint density and linkage estimation across multiple levels in a hierarchical visual clustering framework. In certain embodiments, the linkage (e.g., a linkage probability) for an edge is a value that indicates a probability that the edge is linking (e.g., two) nodes that have a same class. In certain embodiments, the density (e.g., density probability) for a node is a value that indicates the node is a center of a class (e.g., of its k-nearest neighbors).

Certain embodiments herein perform a clustering task on data, for example, by (e.g., automatically) dividing data into subsets (e.g., clusters) based on a measure of similarity, e.g., such that the clusters allow for exploration of structures and variations in the data. In certain embodiments, give a set of N images $\{I_i\}$ and their corresponding visual embeddings $\{f_i\}^N$ for i=1, a system (e.g., machine learning model) first constructs an affinity graph G={V, E} (where V are nodes and E are edges) using k-nearest neighbors, e.g., where each image is represented as a node in the graph with the node feature being its visual embedding and the graph edges then connect each node to its "k" number of neighbors. In certain embodiments, a GNN model (or models) is then effectively applied to prune away spurious edges, producing an edge subset E'. In certain embodiments, the resulting graph G'={V', E'} is split into connected components, with each connected component corresponding to a cluster of nodes. In certain embodiments, a GNN model (e.g., LANDER model) utilizes a different architecture and its attendant loss functions for training.

Certain embodiments herein are directed to a single GNN-based model (e.g., LANDER model) that approximates label-aware linkage probabilities between nodes while simultaneously providing an estimate for the densities of similar nodes that share the same label, for example, with the latter used for providing additional regularization and refining predictions during a final cluster decoding step. In certain embodiments, the GNN model receives an input of a k-NN graph, e.g., such that the system is to first construct the k-NN graph from input data, and inference performance can thus be very sensitive to k. To address this issue, certain embodiments herein provide a hierarchical clustering enhancement (e.g., Hi-LANDER model). An example Hi-LANDER architecture is illustrated in FIG. 1. Operationally, in certain embodiments, the LANDER model groups graph nodes into small clusters, and each cluster is subsequently aggregated as a new node in a coarser, higher-level graph, e.g., iterating this process until convergence to obtain the final clustering results.

FIG. 1 is a block diagram illustrating a hierarchical clustering framework of a machine learning model 100 including a link approximation and density estimation refinement (LANDER) model 104A-104B for visual clustering according to some embodiments. In one embodiment, the models 104A and 104B are a single instance of the same model, but the two instances are shown to illustrate two iterations of operations by the single model.

In certain embodiments, model 100 includes hierarchical clustering framework of LANDER model 104A (e.g., as a module of the model 100) that, given an input of k-NN graph 102A, first passes the graph (e.g., or data representing the graph) through a graph encoder 106A (e.g., GNN module with multiple stacked graph attention network (GAT) layers), and model 104A then generates linkage probabilities 108A $\{e_{ij}\}$ for each edge (e.g., where the solid arrows in FIG. 1 are edges with higher linkage probabilities and the dashed arrows are those with lower linkage probabilities), and then the density probabilities 110A $\{d_i\}$ are generated for each node (e.g., where darker nodes (shown as circles) have higher density in FIG. 1 than the nodes having lighter or hollow circles). In certain embodiments, the linkage probabilities 108A and the density probabilities 110A are provided at 112A to decoder 114A, which then determines edges in E' as the arrows (with three arrows within cluster 116 as one example) and merges the resulting connected components into nodes for output of model 100 or input for the next hierarchy (e.g., with the three nodes from graph 102A within cluster 116 merged into single node 118 in output from first hierarchy (e.g., level) of model 100).

In one embodiment, the output 120A of decoder 114A is used as the clustered results. In another embodiment, output 120A of the merged nodes (e.g., and their corresponding edges) is used to generate graph 102B, which is then input into the from second hierarchy (e.g., level) of model 100 that includes LANDER model 104B. In certain embodiments, this process may be repeated, e.g., as discussed in reference to FIG. 2. In certain embodiments, LANDER model 104B

(e.g., as a module of the model 100), given an input of k-NN graph 102B output from previous level of model 100, passes the graph (e.g., or data representing the graph) through a graph encoder 106B (e.g., GNN module with multiple stacked graph attention network (GAT) layers), and model 104B then generates linkage probabilities 108B $\{e_{ij}\}$ for each edge of output 120A (e.g., where the solid arrows in FIG. 1 are edges with higher linkage probabilities and the dashed arrows are those with lower linkage probabilities), and then the density probabilities 110B $\{d_i\}$ are generated for each node of output 120A (e.g., where darker nodes (shown as circles) have higher density in FIG. 1 than the nodes having lighter or hollow circles). In certain embodiments, the linkage probabilities 108B and the density probabilities 110B are provided at 112B to decoder 114B, which then determines edges in E' as the arrows (with two arrows within cluster 122 as one example) and merges the resulting connected components into nodes for output of model 100 or a next hierarchy (e.g., with the three nodes from graph 102B within cluster 122 merged into single node 124 in output 120B from second hierarchy (e.g., level) of model 100).

LANDER Model

In certain embodiments, LANDER model 104A-104B is designed for clustering in a supervised setting, e.g., where each node $v_i$ in V includes a cluster label $y_i$. In certain embodiments, these labels are used to train a graph encoder 106A (or 106B) GNN that, when presented with a k-NN graph G 102A (or graph 102B), outputs linkage probabilities 108A (or 108B) $\{e_{ij}\}$ and density probabilities 110A (or 110B) $\{d_i\}$ that are then passed through decoder 114A (or 114B) to perform a graph decoding step for producing a next level (e.g., final level) of cluster assignments.

Graph Encoding

Certain embodiments herein utilize a graph attention network (GAT) as graph encoder 106A-106B. Compared to a graph convolutional layer, certain embodiments of a GAT adaptively select the most relevant information from each node's neighborhood for downstream prediction tasks. In certain embodiments, for each node $v_i$ with its input feature $h_i$, a stack of multiple GAT layers encodes the input as the new feature $h'_i$.

Joint Prediction for Density and Linkage

In certain embodiments, for each edge connecting nodes i and j as $(v_i, v_j)$ in E, the source and destination node features are concatenated as $[h'_i, h'_j]$, where [ , ] indicates concatenation operation, and fed it into a shared multilayer perceptron (MLP) layer and a normalized exponential function (e.g., softmax) transformation to produce $p_{ij}$=Probability $(y_i=y_j)$, e.g., an estimate of the probability that this edge is linking two nodes that share the same label (e.g., same class). Certain embodiments use this value to predict a node density probability (e.g., pseudo-density estimate) $\hat{d}_i$, which measures the similarity-weighted proportion of same-class nodes in its neighborhood. Certain embodiments first quantify the similarity between nodes $v_i$ and $v_j$ as $\alpha_{ij}=\cos(f_i, f_j)$, then compute corresponding linkage probabilities (e.g., edge coefficients) $e_{ij}$ as:

$$\hat{e}_{ij} = \text{Prob}(y_i=y_j) - \text{Prob}(y_i \neq y_j) = 2p_{ij}-1, \quad (1)$$

where j indexes the k nearest neighbors of node $v_i$. Then node density probability (e.g., pseudo-density estimate) $\hat{d}_i$ can be determined as:

$$\hat{d}_i = \frac{1}{k}\sum_{j=1}^{k} \hat{e}_{ij} \cdot a_{ij}. \quad (2)$$

In certain embodiments, $\hat{d}_i$ is only a useful density proxy, e.g., not a strict non-negative density that sums to one. In certain embodiments, estimator $\hat{d}_i$ is designed to approximate the ideal expected result (e.g., ground-truth) pseudo-density $d_i$, e.g., which is obtained by replacing $\hat{e}_{ij}$ with $e_{ij}=I(y_i=y_j)-I(y_i \neq y_j)$ in (2) above. In certain embodiments, by construction, $d_i$ will be the largest whenever the most similar neighbors have shared labels, and smaller otherwise. In certain embodiments, by approximating $d_i$ in terms of $\hat{e}_{ij}$ via $p_{ij}$, the resulting joint prediction mechanism reduces parameters for the prediction head during training, thus allowing the two tasks to benefit from one another.

Graph Decoding

In certain embodiments, once the linkage probabilities and node density estimates are obtained, they are converted into (e.g., final) clusters via the following decoding process. For example, initially starting with E'=∅, and given $\hat{e}_{ij}$, $\hat{d}_i$, $p_{ij}$, and an edge connection threshold $p_\tau$, the candidate edge set $\varepsilon(i)$ for node $v_i$ is:

$$\varepsilon(i)=\{j | (v_i, v_j) \in E \text{ and } \hat{d}_i \leq \hat{d}_j \text{ and } p_{ij} \geq p_\tau\}. \quad (3)$$

For any i, if $\varepsilon(i)$ is not empty, certain embodiments pick:

$$j = \underset{j \in \varepsilon(i)}{\text{argmax}} \hat{e}_{ij} \quad (4)$$

where argmax is an operation that finds the argument that gives the maximum value from a target function, and add $(v_i, v_j)$ to E'. The condition $p_{ij} \geq p_\tau$ is an optional filter, e.g., and may be switched to another formula. An example replacement is $\cos(f_i, f_j) \geq s_\tau$, where $s_\tau$ is a similarity cutoff threshold.

In certain embodiments, $\varepsilon(i)$ is defined to ensure that only edges from lower density nodes to higher ones are added to candidate edge set. In this way, each node $v_i$ with a non-empty $\varepsilon(i)$ adds exactly one edge to E' while each node with an empty $\varepsilon(i)$ becomes a peak node with no outgoing edges (e.g., only incoming edges). In certain embodiments, after a full pass over every node, the set E' forms a set of trees, e.g., where each tree is a connected component in graph G' (e.g., graph 102B in FIG. 1 of a graph formed from output 120B), e.g., and its nodes as labeled as belonging to the same cluster.

LANDER Model Training

In certain embodiments, a LANDER model is trained with a composite loss function (L) with two terms as:

$$L = L_{conn} + L_{den} \quad (5)$$

For example, where the first term provides supervision on pair-wise connection (e.g., linkage prediction) and the second on the neighborhood (density estimation) level. Certain embodiments herein utilize an end-to-end framework training the model without introducing additional hyperparameters.

In certain embodiments, the first loss term is the per-edge connectivity loss ($L_{conn}$):

$$\mathcal{L}_{conn} = -\frac{1}{|E|} \sum_{(v_i, v_j) \in E} l_{ij}, \quad (6)$$

where $l_{ij}$ is the per-edge loss in the form:

$$l_{ij} = \begin{cases} q_{ij} \log p_{ij} + (1-q_{ij}) \log(1-p_{ij}), & \text{if } d_i \leq d_j \\ 0, & \text{otherwise} \end{cases}. \quad (7)$$

Where the ideal expected result (e.g., ground-truth) label $q_{ij}=I(y_i=y_j)$ indicates whether the two nodes connected by the edge belong to the same cluster. Note the in certain embodiments, the condition $d_i \leq d_j$ above makes the connectivity predictor specialized to the way it is used in decoding, e.g., it only allows an edge to connect a source node to a neighbor node that has a higher density.

In certain embodiments, the second loss term is the per-node density loss ($L_{den}$):

$$\mathcal{L}_{den} = \frac{1}{|V|}\sum_{i=1}^{|V|}\|d_i - \hat{d}_i\|_2^2. \tag{8}$$

measuring the difference between the density estimate and the corresponding ideal expected result (e.g., ground-truth) density.

Hierarchical Extension to LANDER Model (Hi-LANDER Model)

In certain embodiments, a LANDER model estimates $\hat{d}_i$ values accurately only when the parameter k is properly chosen, for example, where it is generally best to pick a k that roughly matches the average cluster size in the dataset. However, certain embodiments have no knowledge of the average cluster sizes that may exist within the (e.g., test) data that may differ from training. In order to reduce the sensitivity to k, certain embodiments herein utilize a hierarchical augmentation of the LANDER model, e.g., starting with a relatively small k (e.g., a k of 10 or less) and operating a LANDER model to cluster the nodes in one particular hierarchy, and then using the clusters in this hierarchy as new graph nodes for the next level, and repeating this as desired.

FIG. 2 is a block diagram illustrating an example iteration flow 200 of an algorithm for hierarchical graph construction according to some embodiments. In certain embodiments, given a set of N initial visual embeddings $\{f_i\}$, a (e.g., small and fixed) k, and a value L for the maximum number of hierarchies (e.g., where model 104A in FIG. 1 is a first hierarchy level and model 104B in FIG. 1 is a second hierarchy level), a Hi-LANDER model generates a sequence of graphs $\{G_l=(V_l, E_l)\}$ and $\{G'_l=(V_l, E'_l)\}$ where $G_l$ is the k-NN input graph (e.g., graph 102A in FIG. 1) and $G'_l$ is the tree-partition of graph $G'$ for level l. Certain embodiments start with $G'_0=(V_0, E'_0)$, where $|V_0|=N$ and $E'_0=\emptyset$. E.g., where $C_i^{(l)}$ is the i-th connected component in $G'_l$.

In certain embodiments, to generate $G_{l+1}=(V_{l+1}, E_{l+1})$, component $C_i^{(l)}$ in $G_l$ is converted to node $v_i^{(l+1)}$ in $V_{l+1}$, and two node feature vectors (e.g., each vector having 128 floating-point elements) are defined for the new node, e.g., the identity feature $h_i^{(l)}$ and the average feature $\bar{h}_i^{(l)}$ as:

$$h_i^{(l+1)} = h_{m_i}^{(l)} \text{ and } \bar{h}_i^{(l+1)} = \frac{1}{|C_i^{(l)}|}\sum_{j \in C_i^{(l)}} h_j^{(l)}, \tag{9}$$

where $m_i = \text{argmax}_j d_j^{(l)}$ represents the peak node of the connected component $C^{(l)}$. In certain embodiments, $\cos(h_i^{(l+1)}, h_j^{(l+1)})$ is used to compute the similarity between $v_i^{(l+1)}$ and $v_j^{(l+1)}$ in the k-NN algorithm to determine $E_{l+1}$. In certain embodiments, an encoder takes $G_{l+1}=(V_{l+1}, E_{l+1})$ in, with the input feature of node $v_i^{(l+1)}$ being $h_i^{(l+1)} = [h_i^{(l+1)}, \bar{h}_i^{(l+1)}]$. In certain embodiments, a decoder outputs the edge subset $E'_{l+1}$ to cut $G_{l+1}$ into $G'_{l+1}=(V_{l+1}, E'_{l+1})$, and provides the new set of connected components $\{C_i^{(l+1)}\}$. Referring to FIG. 2, note that in certain embodiments, $h_i^{(l)}$ and $\bar{h}_i^{(l)}$ are always in the input visual embedding feature space for any l. Thus, certain embodiments herein ensure that the same model parameters work with any $G_l$, the identity feature $h_i^{(l)}$ can be used to identify similar nodes across multiple hierarchies, and/or the average feature $\bar{h}_i^{(l)}$ provides an overview of the information for all nodes in the cluster.

Hi-LANDER Model Training and Inference

In certain embodiments herein, training of a (e.g., Hi-LANDER) model for a given k for k-nearest neighbors and a given L for the maximum number of hierarchies, includes building a sequence of graphs $\{G_l\}$ with respect to the algorithm in FIG. 2. Certain embodiments herein initialize a (e.g., LANDER) model, and train it on all graphs. For example, in one epoch, looping through each $G_l$, performing a forward pass on graph $\{G_l\}$, computing the loss $L_l$, and then updating the model parameters (e.g., with backpropagation). In certain embodiments herein, performing an inference starts from $G'_0$, and builds the sequence $\{G_l\}$ with l in 1, 2, ... L. With $G_l$, certain embodiments herein assign a cluster identification (ID) value i to connected component $C_i^{(L)}$, and $C_i^{(L)}$ propagates the cluster ID i to all its nodes $\{v_j^{(L)}|v_j^{(L)} \in C_i^{(L)}\}$. In certain embodiments, each $v_i^{(L)}$ propagates its label to the corresponding connected component $C_i^{(L-1)}$ in the previous hierarchy. In certain embodiments, the ID propagation process will eventually assign a cluster ID to every node in $|V_0|$, for example, and this assignment as used as the final clustering result of the model (e.g., the output).

Stopping of Training and Inference

In certain embodiments, a model (e.g., Hi-LANDER) will converge when no new edges are created (e.g., by the network). To ease the effect of noise, certain embodiments herein utilize a heuristic to early-stop the process. In one embodiment where all the clusters are k-ary trees (e.g., a tree with no more than k children for each node), the number of new edges created at a certain level should be $\leq 1/k$ of the number of edges created in the previous level, e.g., and if this heuristic is violated, stop iterating. The stopping threshold may be set in the model, e.g., stopping threshold 350 in FIG. 3. In certain embodiments, a proper subset (e.g., 20%) of clustering training sets are reserved for validation and hyperparameter tuning.

Embodiments herein combine hierarchical clustering with joint density and linkage estimation, e.g., and outperforms other visual clustering. Embodiments herein provide a machine learning model (e.g., Hi-LANDER) that performs visual clustering for datasets with a large mean cluster size. Embodiments herein provide a machine learning model (e.g., LANDER and Hi-LANDER) that reduces hyperparameter tuning, e.g., by picking a same k for different types of datasets (e.g., face, fashion, or natural species datasets using the examples discussed above), e.g., in contrast to another model that struggles to find an optimal k for different datasets.

In certain embodiments, there are three hyperparameters to tune in a (e.g., Hi-LANDER) model: (i) k for k-NN graph building, (ii) the connectivity threshold $p_\tau$, and (iii) similarity cutoff threshold $s_\tau$ to decide whether to link two nodes. Certain embodiments of a (e.g., Hi-LANDER) model begins with the picking of a small enough k since the hierarchical process allows incremental merging of small neighborhoods. One embodiment chooses a fixed k (e.g., k=10) and keeps it fixed for test-time inference. For example, then applying data augmentation by training on k-NN graphs built with a proper subset of k values (e.g., k=10, 5, 3) together. In certain embodiments, this augmentation creates more hierarchies which leads to more training time, as the smaller k uses more levels to cover the whole cluster, though the number of levels L converges exponentially. Assuming that the cluster is a k-ary tree, the selection of L follows the formula: $L=\log_k(C \cdot k-C+1)-1$ where C is the average cluster size for a dataset. Based on the formula and the k values, certain embodiments herein use L=2, 3, 4 for face and nature benchmarks and L=1, 2, 3 for fashion benchmarks. Note that in certain embodiments, the additional k values (e.g., k=5, 3) are only used for training augmentation, e.g., for test-time inference only the single value of k (e.g., k=10) is used and iterated until the (e.g., early) stopping criteria is met. In one embodiment, for a LANDER model (e.g., model(s) 104A-B in FIG. 1) in a hierarchical Hi-LANDER framework. In certain embodiments, a LANDER model has a single layer of graph encoder (e.g., GAT) and a 2-layer MLP for joint linkage and density prediction. In one embodiment, connectivity threshold $p_\tau$ is set to an initial value (e.g., 0.85), e.g., where a high-precision threshold is preferred since completeness can be achieved in later hierarchies with Hi-LANDER. In one embodiment, when a validation set is available, optionally, the similarity cutoff $s_\tau$ can be used instead of the connectivity probability $p_\tau$ where the latter does not always guarantee a better decoding. Certain embodiments utilize similarity thresholding (e.g., with $s_\tau=0$: 9) instead of connectivity thresholding for edge decoding. In certain applications, the difference in optimal k is primarily due to drastically varying average cluster size in the different datasets, and thus there is no single, generic k that fits all. As such, embodiments of Hi-LANDER model significantly improve the generalization ability for visual clustering tasks, for example, achieved when the cluster size in test set is not leaked (e.g., embodiments of the Hi-LANDER model remove this impractical assumption where the model is cluster size insensitive).

Figure 3:
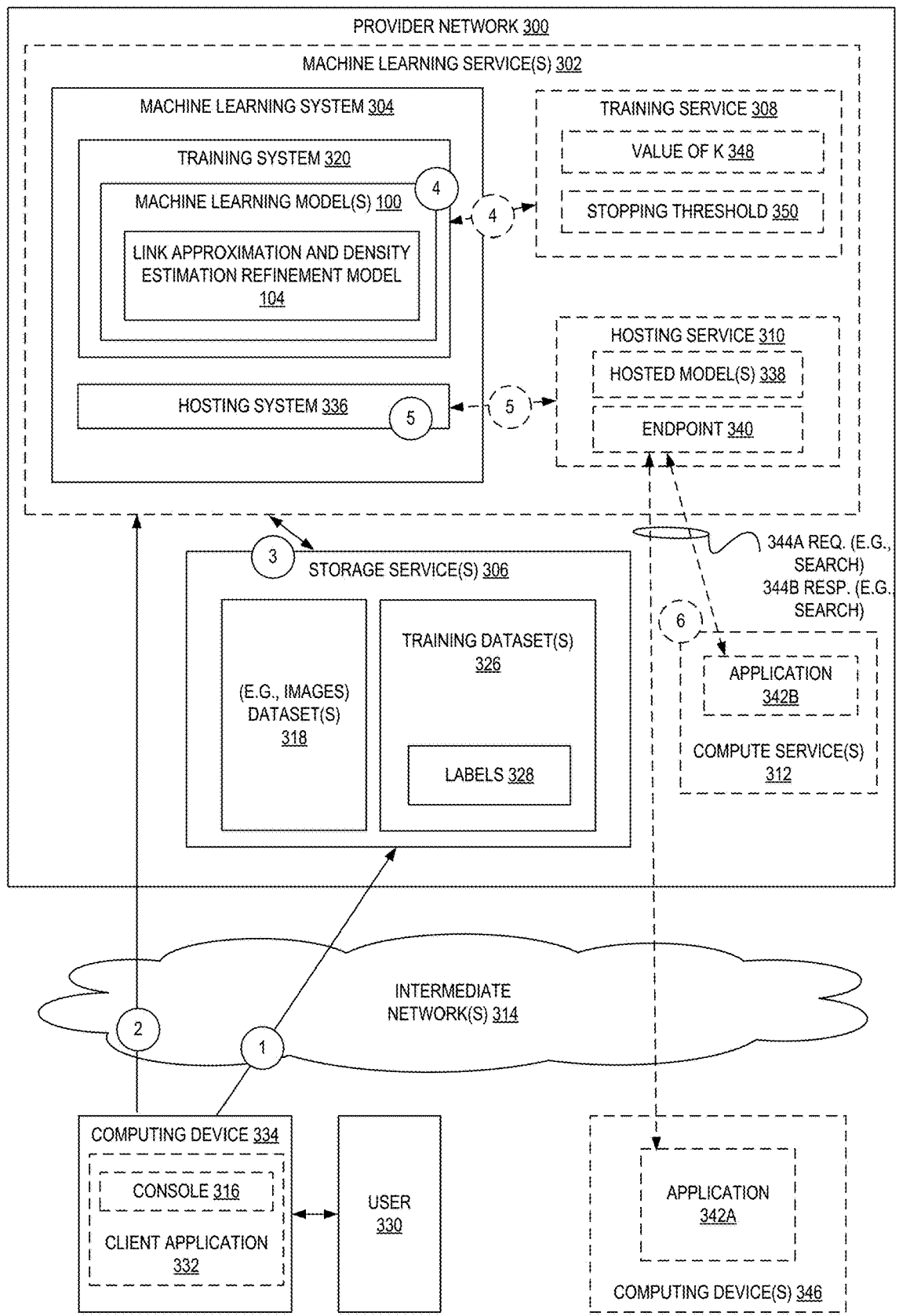
FIG. 3 is a diagram illustrating an environment for creating, training, and using models of a machine learning service according to some embodiments.

FIG. 3 is a diagram illustrating an environment for creating, training, and using models of a machine learning service 302 according to some embodiments. FIG. 3 includes a machine learning system 304, one or more storage services 306, one or more training services 308, one or more hosting service 310, and one or more compute services 312 implemented within a multi-tenant provider network 300. Each of the machine learning service 302, one or more storage services 306, one or more training services 308, one or more hosting service 310, and one or more compute services 312 may be implemented via software, hardware, or a combination of both, and may be implemented in a distributed manner using multiple different computing devices.

A provider network 300 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 312), a storage service 306 that can store data objects, etc. The users (or "customers") of provider networks 300 may utilize one or more user accounts that are associated with a customer account, though these terms may be used somewhat interchangeably depending upon the context of use. Users may interact with a provider network 300 across one or more intermediate networks 314 (e.g., the internet) via one or more interface(s), such as through use of application programming interface (API) calls, via a console 316 implemented as a website or application, etc. The interface(s) may be part of, or serve as a front-end to, a control plane of the provider network 300 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 300 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 300 by an on-demand code execution service (which may be one of compute service(s) 312) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 340B) that can be executed on demand, without requiring the user to maintain dedicated infrastructure to execute the serverless function. Instead, the serverless functions can be executed on demand using resources maintained by the provider network 300. In some embodiments, these resources may be maintained in a "ready" state (e.g., having a pre-initialized runtime environment configured to execute the serverless functions), allowing the serverless functions to be executed in near real-time.

The machine learning service 302, in some embodiments, is a machine learning powered service that makes it easy for users to perform visual clustering tasks. Visual clustering may be used to discover structures in data, e.g., by automatically dividing data into subsets based on a measure of similarity, embodiments of clustering provide a powerful means to explore structures and variations in data. Visual clustering may be used in automatic photo grouping, image tagging, data annotation, etc. Visual clustering may be used within facial recognition tasks, e.g., one or any combination of: face identification (e.g., identifying a face), face recognition (e.g., identifying a specific face), facial landmark localization (e.g., identifying the parts of a face such as eyes, nose, etc.), and face attributes detection (e.g., estimating an age or gender). In some embodiments, the machine learning service 302—via use of training service 308—allows users to build and use machine learning model(s) 100 to perform visual clustering tasks (e.g., on one or more image dataset(s) 318). In some embodiments, the machine learning service 302 (e.g., training system 320) trains and uses LANDER model 104 (e.g., in addition to an embedding model and a classifier model).

The training system 320, for example, may enable users to generate a LANDER model 104 that outputs merged node(s) for a set of nodes of an input k-NN graph (e.g., where k is set in value of k 348) for an input of a set of images, e.g., from image dataset 318. In certain embodiments, machine learning model 100 is a hierarchy of LANDER models (Hi-LANDER) that cluster the nodes in one particular hierarchy, and then uses the clusters in this hierarchy as new graph nodes for the next level, and repeats this as desired (e.g., until reaching stopping threshold 350).

Embodiments herein allow a customer to create a machine learning model 100 (e.g., LANDER model or Hi-LANDER model) by supplying a training dataset 326 (e.g., including labels 328 that indicate a class for certain features). In certain embodiment, a labeled dataset 326 required for training consists of images with a desired class associated with them.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and testing data); model selection; model training; model evaluation; and status reporting. Inference may include the following responsibilities: model loading and hosting; and inference (e.g., synchronous and batch).

Training may include using a hyperparameter optimization (HPO) pipeline to evaluate a plurality of models and respective configurations. Training may perform a grid search over the matrix of experiments (e.g., defined upfront) in search for the model and its parameters that performs best on the given dataset.

Thus, a user 330 may provide or otherwise identify a training dataset 326 with labels 328 (e.g., visual embeddings for images and their corresponding labels 328) for use in creating a model. For example, as shown at circle (1), the user 330 may utilize a client application 332 executed by a computing device 334 (e.g., a web-application implementing a console 316 for the provider network 300, a standalone application, another web-application of another entity that utilizes the machine learning service 302 as a part of its backend, a database or mixed-SQL environment, etc.) to cause the computing device 334 to upload the training dataset 326 with labels 328 to a storage location (e.g., provided by a storage service 306 such as an object storage service of a provider network 300).

Thereafter, at circle (2) the computing device 334 may issue one or more requests (e.g., API calls) to the machine learning service 302 that indicate the user's 330 desire to train a machine learning model 100 (e.g., LANDER model 104). The request may be of a type that identifies which type of model is to be created, e.g., CreateLANDERModel for creating LANDER model 104, CreateHi-LANDERModel for creating a hierarchy of LANDER models, etc. The request may also include one or more of an identifier of a storage location or locations storing the training dataset 326 (e.g., an identifier of just the documents, an identifier of just the labels 328, an identifier associated with both the documents and labels, etc.), which may identify a storage location (e.g., via a Uniform Resource Locator (URL), a bucket/folder identifier, etc.) within the provider network 300 (e.g., as offered by a storage service 306) or external to the provider network 300, a format identifier of the dataset 326, a language identifier of the language of the dataset 326, labels 328, etc.

Responsive to receipt of the request, the training system 320 of the machine learning service 302 is invoked and begins operations for training the corresponding type of model(s).

In some embodiments, the training (at circle (4)) of the machine learning model 100 (e.g., LANDER model 104) includes use (at optional, dotted circle (4)) of a separate training service 308 of machine learning service 302; similarly, the hosting system 336 may make use (at optional, dotted circle (5)) of a hosting service 310 of a machine learning service 302 to deploy a model as a hosted model 338 in association with an endpoint 340 that can receive search requests from client applications 342A and/or 342B at circle (6), provide the inference requests 344A to the associated hosted model(s) 338, and provide results 344B (e.g., clustering results and/or search results if using the clustering results for a search, etc.) back to applications 342A and/or 342B, which may be executed by one or more computing devices 346 outside of the provider network 300 or by one or more computing devices of a compute service 312 (e.g., hardware virtualization service, serverless code execution service, etc.) within the provider network 300.

For example, when a user 330 desires to train a machine learning model 100 (e.g., LANDER model 104), a visual clustering model training dataset of the training dataset 326 may be used. For example, according to the training discussed herein.

Thus, a trained machine learning model 100 (e.g., LANDER model 104) may receive an input of an image dataset 318 and output merged node(s) for a set of nodes of an input (e.g., an input k-NN graph). In one embodiment, image dataset 318 is a gallery of images.

In certain embodiments, facial recognition software applications recognize facial features by extracting features from an image with a human face, e.g., and clustering images with a clustering model into a different cluster for each human face. The features may include the relative position, size and shape of the eyes, nose, mouth, jaw, ears, etc. Certain embodiments herein rely on an embedding model that is trained to generate a set of features from an image. In certain embodiments, an embedding model generates a visual (e.g., face) embedding (e.g., vector) that represents features of a detected face.

The extracted features (e.g., face embedding) may then be used to identify an object (e.g., a face in an image) by matching features, e.g., matching features to its most similar node (e.g., and that node's label/class is used as the label/class of the input corresponding to the extracted features). Facial recognition software applications may also use a classifier to perform one or more facial recognition tasks based on the extracted features. Example facial recognition tasks include face identification (e.g., identifying a face), face recognition (for example, identifying a specific face, e.g., for verification of an authorized user for a face verification), facial landmark localization (e.g., identifying the parts of a face such as eyes, nose, etc.), and face attributes detection (e.g., estimating an age or gender).

Figure 4:
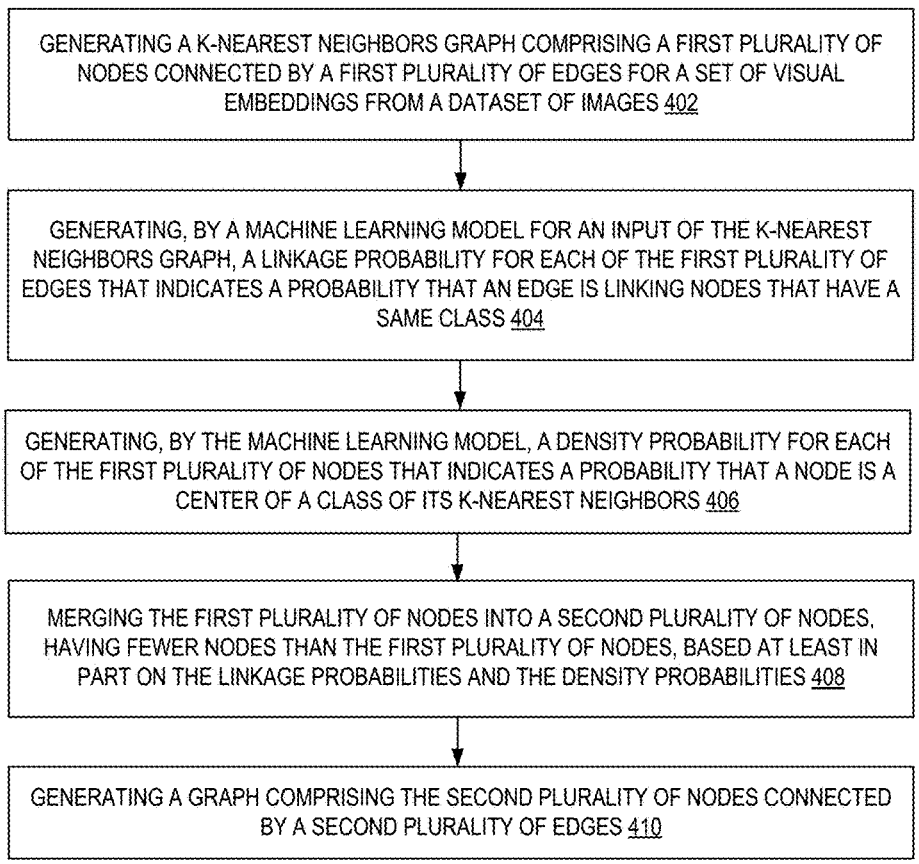
FIG. 4 is a flow diagram illustrating operations of a method for using a machine learning model that includes a link approximation and density estimation refinement model to generate a graph according to some embodiments.

FIG. 4 is a flow diagram illustrating operations 400 of a method for using a machine learning model that includes a link approximation and density estimation refinement model to generate a graph according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

The operations 400 include, at block 402, generating a k-nearest neighbors graph comprising a first plurality of nodes connected by a first plurality of edges for a set of visual embeddings from a dataset of images. The operations 400 include, at block 404, generating, by a machine learning model for an input of the k-nearest neighbors graph, a linkage probability for each of the first plurality of edges that indicates a probability that an edge is linking nodes that have a same class. The operations 400 include, at block 406, generating, by the machine learning model, a density probability for each of the first plurality of nodes that indicates a probability that a node is a center of a class of its k-nearest neighbors. The operations 400 include, at block 408, merging the first plurality of nodes into a second plurality of nodes, having fewer nodes than the first plurality of nodes, based at least in part on the linkage probabilities and the density probabilities. The operations 400 include, at block 410, generating a graph comprising the second plurality of nodes connected by a second plurality of edges.

Figure 5:
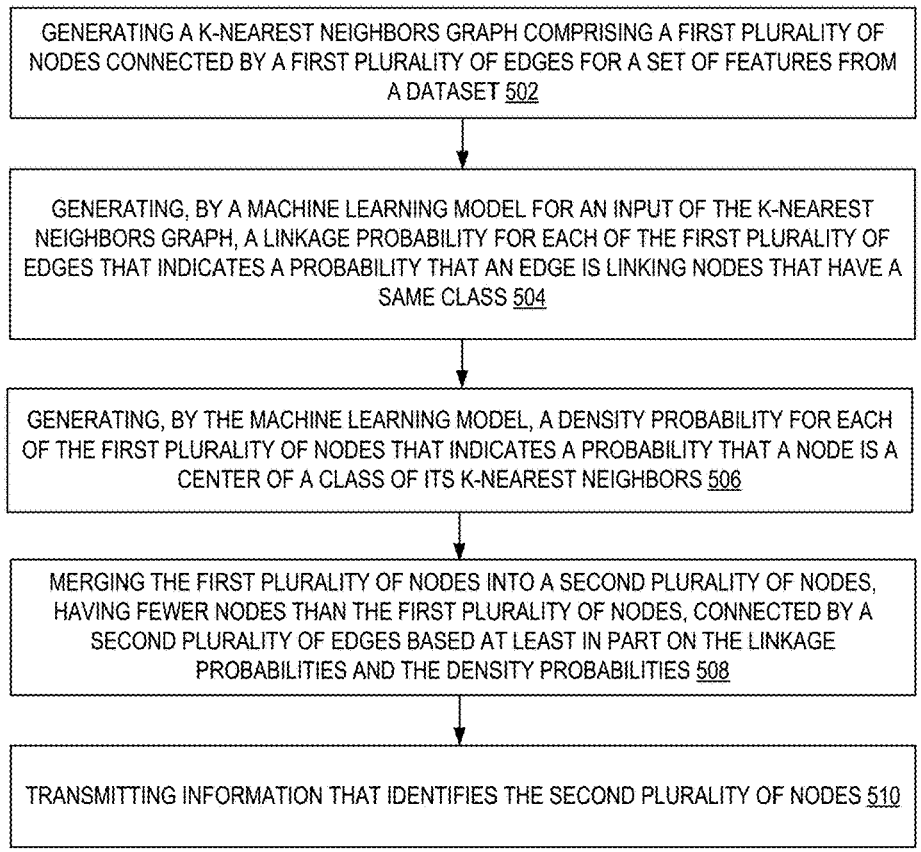
FIG. 5 is a flow diagram illustrating operations of a method for using a machine learning model that includes a link approximation and density estimation refinement model according to some embodiments.

FIG. 5 is a flow diagram illustrating operations 500 of a method for using a machine learning model that includes a link approximation and density estimation refinement model according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

The operations 500 include, at block 502, generating a k-nearest neighbors graph comprising a first plurality of nodes connected by a first plurality of edges for a set of features from a dataset. The operations 500 include, at block 504, generating, by a machine learning model for an input of the k-nearest neighbors graph, a linkage probability for each of the first plurality of edges that indicates a probability that an edge is linking nodes that have a same class. The operations 500 include, at block 506, generating, by the machine learning model, a density probability for each of the first plurality of nodes that indicates a probability that a node is a center of a class of its k-nearest neighbors. The operations 500 include, at block 508, merging the first plurality of nodes into a second plurality of nodes, having fewer nodes than the first plurality of nodes, connected by a second plurality of edges based at least in part on the linkage probabilities and the density probabilities. The operations 500 include, at block 510, transmitting information that identifies the second plurality of nodes.

Embodiments herein are directed to a hierarchical graph neural network visual clustering framework that removes the necessity to carefully select k (e.g., the k bandwidth) parameter for test time k-NN graph construction on different visual clustering applications. This significantly improves the generalization of GNN-based visual clustering. Embodiments herein are directed to a novel joint graph linkage prediction and density estimation model for efficient and accurate clustering performance.

Figure 6:
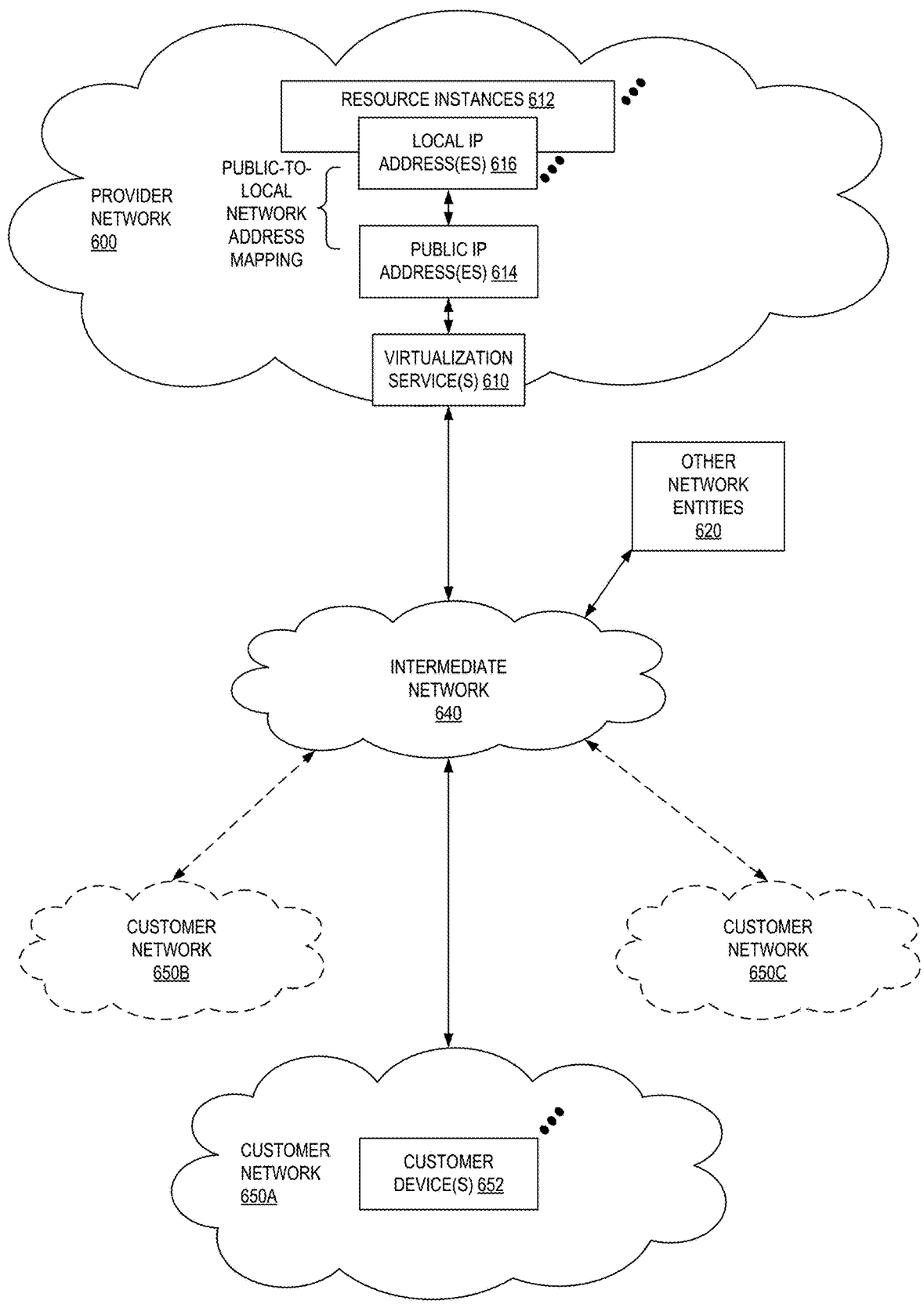
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
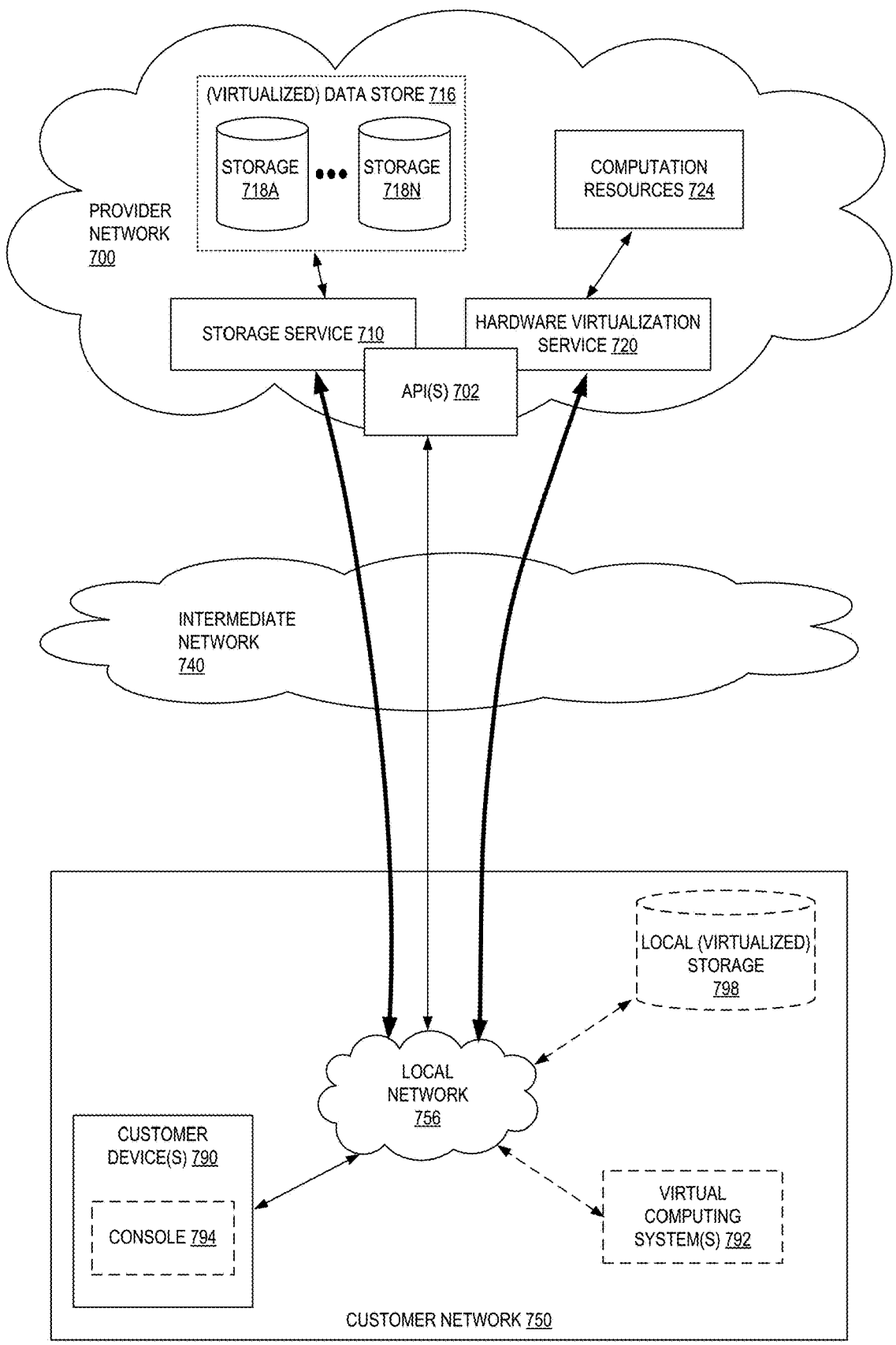
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
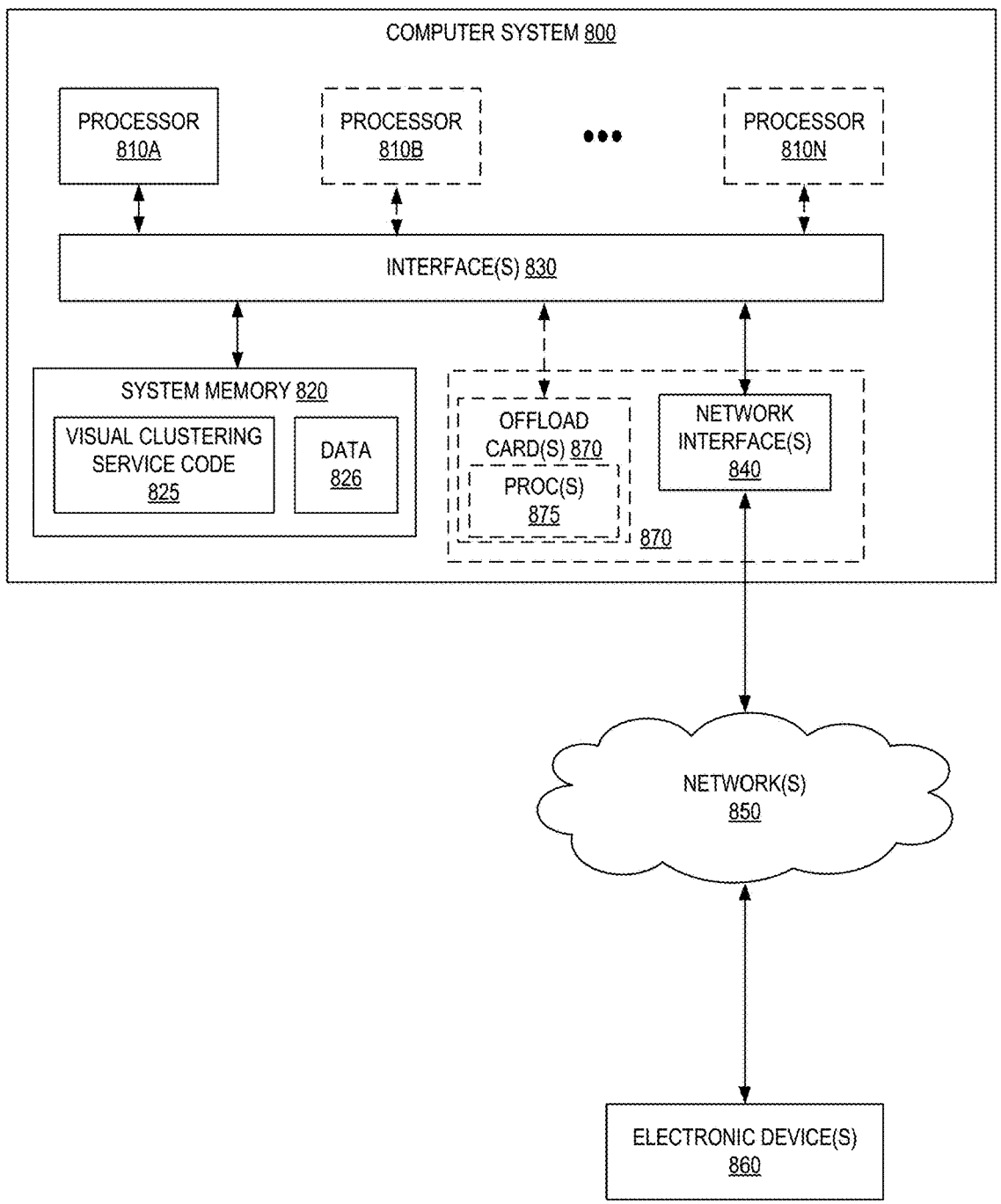
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the ×86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as visual clustering service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(®), Microsoft(®), Sybase(®), IBM(®), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
generating a k-nearest neighbors graph comprising a first plurality of nodes connected by a first plurality of edges for a set of visual embeddings from a dataset of images where k is a positive integer;
generating, by a machine learning model for an input of the k-nearest neighbors graph, a linkage probability for each of the first plurality of edges that indicates a probability that an edge is linking nodes that have a same class;
generating, by the machine learning model, a density probability for each of the first plurality of nodes that indicates a probability that a node is a center of a class of its k-nearest neighbors;
merging the first plurality of nodes into a second plurality of nodes, having fewer nodes than the first plurality of nodes, based at least in part on the linkage probabilities and the density probabilities; and
generating a graph comprising the second plurality of nodes connected by a second plurality of edges.

2. The computer-implemented method of claim 1, wherein the generating the density probabilities is based at least in part on an input of the linkage probabilities into the machine learning model.

3. The computer-implemented method of claim 1, further comprising:
inputting the graph comprising the second plurality of nodes connected by the second plurality of edges into the machine learning model;
generating, by the machine learning model, a second linkage probability for each of the second plurality of edges that indicates a probability that an edge is linking nodes that have a same class;
generating, by the machine learning model, a second density probability for each of the second plurality of nodes that indicates a probability that a node is a center of a class of its k-nearest neighbors;
merging the second plurality of nodes into a third plurality of nodes, having fewer nodes than the second plurality of nodes, based at least in part on the second linkage probabilities and the second density probabilities; and
generating a second graph comprising the third plurality of nodes connected by a third plurality of edges.

4. A computer-implemented method comprising:
generating a k-nearest neighbors graph comprising a first plurality of nodes connected by a first plurality of edges for a set of features from a dataset where k is a positive integer;
generating, by a machine learning model for an input of the k-nearest neighbors graph, a linkage probability for each of the first plurality of edges that indicates a probability that an edge is linking nodes that have a same class;
generating, by the machine learning model, a density probability for each of the first plurality of nodes that indicates a probability that a node is a center of a class of its k-nearest neighbors;
merging the first plurality of nodes into a second plurality of nodes, having fewer nodes than the first plurality of nodes, connected by a second plurality of edges based at least in part on the linkage probabilities and the density probabilities; and
transmitting information that identifies the second plurality of nodes.

5. The computer-implemented method of claim 4, wherein the generating the density probabilities is based at least in part on an input of the linkage probabilities into the machine learning model.

6. The computer-implemented method of claim 4, wherein a value of k for the k-nearest neighbors is not modified by the machine learning model.

7. The computer-implemented method of claim 4, further comprising:
inputting the second plurality of nodes connected by a second plurality of edges into the machine learning model;
generating, by the machine learning model, a second linkage probability for each of the second plurality of edges that indicates a probability that an edge is linking nodes that have a same class;
generating, by the machine learning model, a second density probability for each of the second plurality of nodes that indicates a probability that a node is a center of a class of its k-nearest neighbors;
merging the second plurality of nodes into a third plurality of nodes, having fewer nodes than the second plurality of nodes, based at least in part on the second linkage probabilities and the second density probabilities; and
transmitting information that identifies the third plurality of nodes.

8. The computer-implemented method of claim 7, wherein a value of k for the k-nearest neighbors is not modified by the machine learning model.

9. The computer-implemented method of claim 7, wherein the generating the second density probabilities is based at least in part on an input of the second linkage probabilities into the machine learning model.

10. The computer-implemented method of claim 4, further comprising repeatedly inputting an output of merged nodes from the machine learning model back into the machine learning model as a next input into the machine learning model, until a threshold number of new edges are created, to generate a final plurality of nodes connected by one or more edges.

11. The computer-implemented method of claim 10, wherein the threshold number of new edges is zero.

12. The computer-implemented method of claim 4, wherein the merging comprises connecting an edge from a source node only to a node of its k-nearest neighbors that has a higher density probability.

13. The computer-implemented method of claim 12, wherein the merging further comprises labeling those connected nodes of the first plurality of nodes as belonging to a same node in the second plurality of nodes.

14. The computer-implemented method of claim 4, wherein feature vectors of the first plurality of nodes have a same format as feature vectors of the second plurality of nodes.

15. A system comprising:
 a first one or more electronic devices to implement a storage service in a multi-tenant provider network to store a dataset; and
 a second one or more electronic devices to implement a machine learning service in the multi-tenant provider network, the machine learning service including instructions that upon execution cause the machine learning service to perform operations comprising:
  generating a k-nearest neighbors graph comprising a first plurality of nodes connected by a first plurality of edges for a set of features from the dataset where k is a positive integer,
  generating, by a machine learning model for an input of the k-nearest neighbors graph, a linkage probability for each of the first plurality of edges that indicates a probability that an edge is linking nodes that have a same class,
  generating, by the machine learning model, a density probability for each of the first plurality of nodes that indicates a probability that a node is a center of a class of its k-nearest neighbors,
  merging the first plurality of nodes into a second plurality of nodes, having fewer nodes than the first plurality of nodes, connected by a second plurality of edges based at least in part on the linkage probabilities and the density probabilities, and
  transmitting information that identifies the second plurality of nodes.

16. The system of claim 15, wherein the generating the density probabilities is based at least in part on an input of the linkage probabilities into the machine learning model.

17. The system of claim 15, wherein a value of k for the k-nearest neighbors is not modified by the machine learning model.

18. The system of claim 15, wherein the operations further comprise:
 inputting the second plurality of nodes connected by a second plurality of edges into the machine learning model;
 generating, by the machine learning model, a second linkage probability for each of the second plurality of edges that indicates a probability that an edge is linking nodes that have a same class;
 generating, by the machine learning model, a second density probability for each of the second plurality of nodes that indicates a probability that a node is a center of a class of its k-nearest neighbors;
 merging the second plurality of nodes into a third plurality of nodes, having fewer nodes than the second plurality of nodes, based at least in part on the second linkage probabilities and the second density probabilities; and
 transmitting information that identifies the third plurality of nodes.

19. The system of claim 15, wherein the operations further comprise repeatedly inputting an output of merged nodes from the machine learning model back into the machine learning model as a next input into the machine learning model, until a threshold number of new edges are created, to generate a final plurality of nodes connected by one or more edges.

20. The system of claim 15, wherein the merging comprises:
 connecting an edge from a source node only to a node of its k-nearest neighbors that has a higher density probability; and
 labeling those connected nodes of the first plurality of nodes as belonging to a same node in the second plurality of nodes.

* * * * *